(12) United States Patent
Thurston et al.

(10) Patent No.: US 7,027,882 B2
(45) Date of Patent: Apr. 11, 2006

(54) COMPACT IMPLEMENTATIONS FOR LIMITED-RESOURCE PLATFORMS

(75) Inventors: Nathaniel Thurston, Somerville, MA (US); Devin Hosea, Boston, MA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 501 days.

(21) Appl. No.: 10/204,881

(22) PCT Filed: May 15, 2002

(86) PCT No.: PCT/US02/15661

§ 371 (c)(1),
(2), (4) Date: Aug. 23, 2002

(87) PCT Pub. No.: WO03/073375

PCT Pub. Date: Sep. 4, 2003

(65) Prior Publication Data

US 2003/0163518 A1 Aug. 28, 2003

Related U.S. Application Data

(60) Provisional application No. 60/360,089, filed on Feb. 25, 2002.

(51) Int. Cl.
*G06N 5/00* (2006.01)

(52) U.S. Cl. .......................... 700/90; 706/45

(58) Field of Classification Search .................. 700/90; 706/45, 46; 718/101; 370/401; 379/115.01
See application file for complete search history.

(56) References Cited

U.S. PATENT DOCUMENTS

| | | | | |
|---|---|---|---|---|
| 5,428,782 | A | * 6/1995 | White | .................. 718/101 |
| 5,621,727 | A | * 4/1997 | Vaudreuil | .................. 370/401 |
| 5,633,919 | A | * 5/1997 | Hogan et al. | .......... 379/115.01 |
| 5,694,601 | A | * 12/1997 | White | .................. 718/101 |
| 5,926,624 | A | 7/1999 | Katz et al. | |
| 5,990,890 | A | 11/1999 | Etheredge | |
| 5,991,751 | A | 11/1999 | Rivette et al. | |
| 6,005,597 | A | 12/1999 | Barrett et al. | |

(Continued)

FOREIGN PATENT DOCUMENTS

WO  WO 00/33224 A1  6/2000

(Continued)

OTHER PUBLICATIONS

Wiegand, Thomas, et al., Overview of the H.264/AVC Video Coding Standard, IEEE Transactions on Circuits and Systems for Video Technology, Jul. 2003, pp. 1-19.*

*Primary Examiner*—Wilbert L. Starks, Jr.
(74) *Attorney, Agent, or Firm*—Patterson & Sheridan, LLP

(57) ABSTRACT

Methods and systems to enable simplified, compact implementations of profiling and other functions on STBs or other limited-resource computing platforms. For every television show transmitted from the server to the STB, the server also sends a classifying group identifier for the show. The STB then generates user profiles, ratings and/or recommendations, based on the group identifiers, simplifying the STB's processing tasks. Exception processing, special cases, or changes in group assignments or algorithms are handled at the server. The STB calculates viewing profiles based on recording statistics about content its user(s) view, based on the group identifiers. In another embodiment, the STB provides ratings and/or recommendations using group identifier information and related statistics. User privacy is maintained by stripping off and discarding personal information or averaging user profile information to erase or "blur" any suggestions of personal information.

10 Claims, 3 Drawing Sheets

| U.S. PATENT DOCUMENTS | | | FOREIGN PATENT DOCUMENTS | | |
|---|---|---|---|---|---|
| 6,088,722 A | 7/2000 | Herz et al. | WO | WO 00/49801 A1 | 8/2000 |
| 6,163,316 A | 12/2000 | Killian | | | |
| 6,177,931 B1 | 1/2001 | Alexander et al. | * cited by examiner | | |

COMPACT IMPLEMENTATIONS FOR LIMITED-RESOURCE PLATFORMS

PRIORITY CLAIM

The present application claims priority to Provisional Application Ser. No. 60/360,089 entitled "Compact Implementations for Limited-Resource Platforms", filed on Feb. 25, 2002, now abandoned, and having a common inventive entity.

INCORPORATION BY REFERENCE

The present application for United States patent incorporates by reference the following commonly-owned patent applications, as if set forth in their entirety herein, for all purposes:

WO 0120481A2 {Predictive Networks PCT application};

PCT Application No. PCT/US02/15661 entitled "Privacy-Maintaining Methods and Systems For Collecting Information" filed May 15, 2002;

U.S. Patent Application No. 60/338,398 filed Dec. 7, 2001;

U.S. patent application entitled: "Television Program Navigation Guide" filed Dec. 5, 2001;

U.S. patent application entitled: "Method and System for Selective Initial Television Channel Display" filed Oct. 22, 2001;

U.S. patent application Ser. No. 09/969,911 filed Oct. 3, 2001;

U.S. patent application entitled: "Method and System for Parsing Purchase Information from Web Pages filed Aug. 29, 2001;

U.S. patent application Ser. No. 09/928,493 filed Aug. 13, 2001;

U.S. patent application Ser. No. 09/877,974 filed Jun. 7, 2001;

U.S. patent application Ser. No. 09/558,755 filed Apr. 21, 2001;

U.S. Patent Application No. 60/282,028 filed Apr. 6, 2001;

U.S. patent application Ser. No. 09/798,337 filed Mar. 2, 2001;

U.S. patent application Ser. No. 09/777,807 filed Feb. 5, 2001;

U.S. patent application Ser. No. 09/767,693 filed Jan. 23, 2001; and

U.S. patent application Ser. No. 09/766,377 filed Jan. 19, 2001.

BACKGROUND OF THE INVENTION

With hundreds of TV channels and scheduled programs from which to choose, together with personal video recorder (PVR)-recorded shows, pay-per-view (PPV), video-on-demand (VOD) and other content, TV viewers and other content users are faced with a nearly overwhelming choice of entertainment and other content options.

In response, various electronic or interactive programming guide (EPG/IPG) systems have been proposed or developed to enhance TV viewers' ability to navigate through and select programming. Examples of such systems are set forth in the following U.S. and foreign patent documents, among others, the disclosures of which are incorporated herein by reference as if set forth in their entirety here:

U.S. Pat. No. 6,177,931 Alexander et al.
U.S. Pat. No. 6,163,316 Killian
U.S. Pat. No. 6,005,597 Barrett et al.
WO 0049801A1 Yuen et al.
WO 0033224A1 Yuen Many such systems, including those disclosed in the listed documents, use profiling processes to develop information about viewers and thereby provide content ratings or recommendations. Typical profiling processes, however, are relatively complex, and require significant computational resources. This, in turn, necessitates complex and expensive set-top box (STB) hardware.

It is therefore desirable to provide methods and systems that enable compact implementations of profiling and other functions on limited-resource platforms such as set-top boxes (STBs) and the like.

It is also desirable to employ methods and systems that enable the collection of information for collaborative filtering and other legitimate purposes, utilizing compact implementations of profiling and other functions, on limited-resource platforms such as set-top boxes (STBs) and the like, to generate multi-dimensional user profiles that avoid the transmission or storage of private, identifiable, personal information.

SUMMARY OF THE INVENTION

The invention provides methods and systems to enable simplified, compact implementations of profiling and other functions on STBs or other limited-resource computing platforms. The invention is based on the principle that for every television show transmitted from the server to the STB, the server also sends associated "group numbers" indicating, for example, that "the current show belongs to Group No. 20 (sports) and Group No. 35 (football)." The STB can then execute its processing, such as the generation of user profiles, ratings and/or recommendations, based on the group numbers. Because of the information implicit in the group numbers, the STB's processing tasks are greatly simplified. Exception processing, special cases, or changes in group assignments or algorithms can be handled at the server. It will be appreciated that non-numerical identifiers, and indeed, any form of identifiers can be used in place of numbers. These may include letters or other symbols as appropriate.

The STB can calculate profiles, for example, based on simply observing and recording statistics about content its user(s) view, based on the group numbers. For example, the STB can easily determine the following: "How often does viewer X watch programs in group Y?" Optionally, the STB could also provide ratings and/or recommendations using group number information and related statistics.

The present invention further provides methods and systems for collecting and aggregating information from user terminals, such as set-top boxes (STBs) that may employ electronic programming guide (EPG) features, without the necessity of collecting or storing personal, private user information. The invention also enables collaborative filtering and the generation of recommended future decisions based on anonymous user profile information.

BRIEF DESCRIPTION OF THE DRAWINGS

Features and advantages of the present invention will become apparent to those skilled in the art from the description below, with reference to the following drawing figures, in which.

DESCRIPTION OF ILLUSTRATED EMBODIMENTS

The invention provides methods and systems enabling compact implementations of profiling and other functions on STBs and other limited-resource computing platforms.

Figure 1:
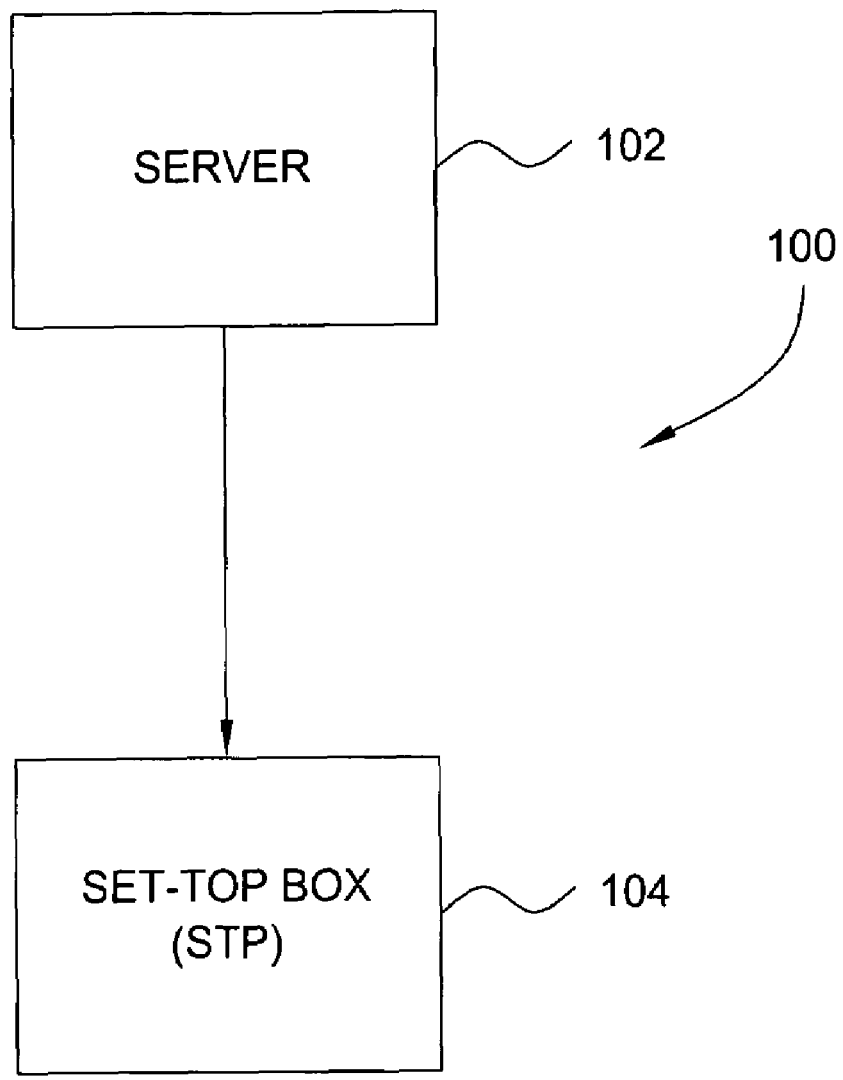
FIG. 1 is a schematic diagram of a content distribution system in which the present invention may be deployed.

Prior Art Systems: As shown in FIG. 1, the methods and systems of the invention are advantageously deployed in an otherwise conventional, networked content distribution system 100, such as a television content distribution system including a conventional server 102 and at least one conventional STB 104. The server 102 and STBs 104 can be constructed in accordance with known principles such as those disclosed in the above-listed patent documents, which are incorporated herein by reference in their entirety as if set forth fully herein. In general, as shown in FIG. 2, the server 102 is operable to send content to the STBs 104, and the STBs 104 can send requests, acknowledgements and other information to the server.

Present Invention: FIG. 2 shows method steps executed in accordance with one practice of the present invention, as deployed in a television content distribution system like that shown in FIG. 1.

Figure 2:
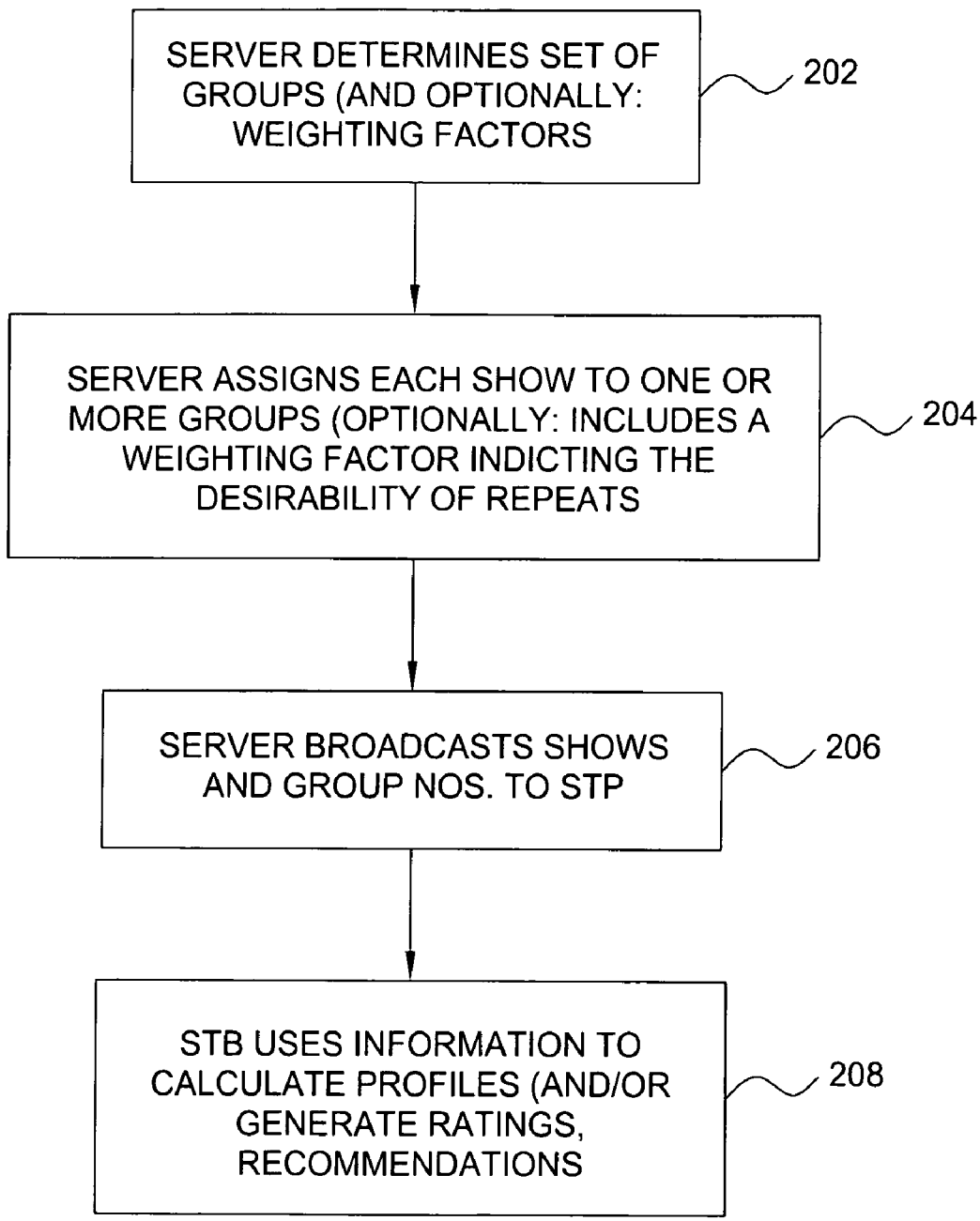
FIG. 2 is a flowchart illustrating method steps of one practice of the present invention.

As illustrated in FIG. 2, the server 102 first determines:

(1) a collection of "groups" to which various television shows or other content may be assigned (e.g., by genre, such as sports, comedy and the like), and optionally a weighting factor for each group in a step 202;

(2) for each television show or other content, a group identification (ID) value of the group or groups to which the content may be assigned (e.g., groups 1, 2 and 7) in a step 204; and (3) optionally, a weighting factor indicating the desirability of repeats for the show further in step 204.

Next, the server broadcasts this information to the STBs 104 with which it is in communication via a conventional communications link (whether via cable, telephone lines, satellite, the Internet or other) in a step 206.

Upon receiving the information, the STBs 104 can use the information to calculate profiles, provide recommendations and/or ratings in a step 208. The calculation of profiles, for example, is greatly simplified, since a useful profile can be as simple as "Content from Group X accounts for N % of Viewer Y's selections/viewing time."

Assigning Group Numbers: As noted above, this occurs at the server. One example of the way groups could be assigned might use the following organization of groups within the server:

1 Groups With Same Name
2 Groups for each Genre (drama, comedy, sports, history, etc.)
. . .

In this way, a taxonomy of groups can be maintained by the server, to organize the assignment of group numbers.

At the STB: Because of the information implicit in the group numbers, by virtue of pre-processing by the server, the STB's tasks can be reduced. The calculation of profiles, for example, is greatly simplified, since a useful profile can be as simple as "Content from Group X accounts for N % of Viewer Y's selections/viewing time." Thus, to generate profiles, the STB need only execute a simplified "profile algorithm" using the group numbers. The profile algorithm could be based on previously gathered statistics about how much of each group (or a particular group, or the groups of a presently available set of programs) a particular viewer watches; and a relative strength weighting coefficient can be generated on the basis of those statistics.

Many other profiling algorithms using this information can also be used (see, for example, a discussion of profiling algorithms set forth in the Yuen WIPO publications incorporated herein by reference), and are within the scope of the present invention.

The methods and systems of the invention provide a number of technical advantages over prior art systems. In particular, the invention enables an extremely fast, compact implementation of recommendation and other functions, suitable for limited-resource platforms such as STBs.

Because a significant amount of information is already implicit in the groupings (e.g., genre or other programmatic information), there is no need to transmit such information relevant to the groupings (e.g., whether a particular show is a comedy or a sports program). Using the server to assign content to groups also reduces the amount of information that needs to be saved or coded at the STB.

In addition, whenever necessary or desired, group assignment or other algorithmic changes can be made on the server, without the necessity of updating the clients.

The invention also enables collaborative filtering, a method that enables individuals to benefit from the aggregated knowledge, experience, and decision-making history of similarly-situated individuals. In general, collaborative filtering operates by using the decisions a first individual makes to locate a group of other individuals who made similar decisions, and then using the aggregate decisions made by the group to suggest possible future (or alternative) actions by the first individual. A well-known example of collaborative filtering is the "Others Who Bought This Book Also Liked . . . " recommendations from various online booksellers such as Amazon.com. In the context of the present invention, the STB can provide recommendations such as "Viewers who selected (or enjoyed) this content also selected (or enjoyed) the following programs . . . "

Figure 3:
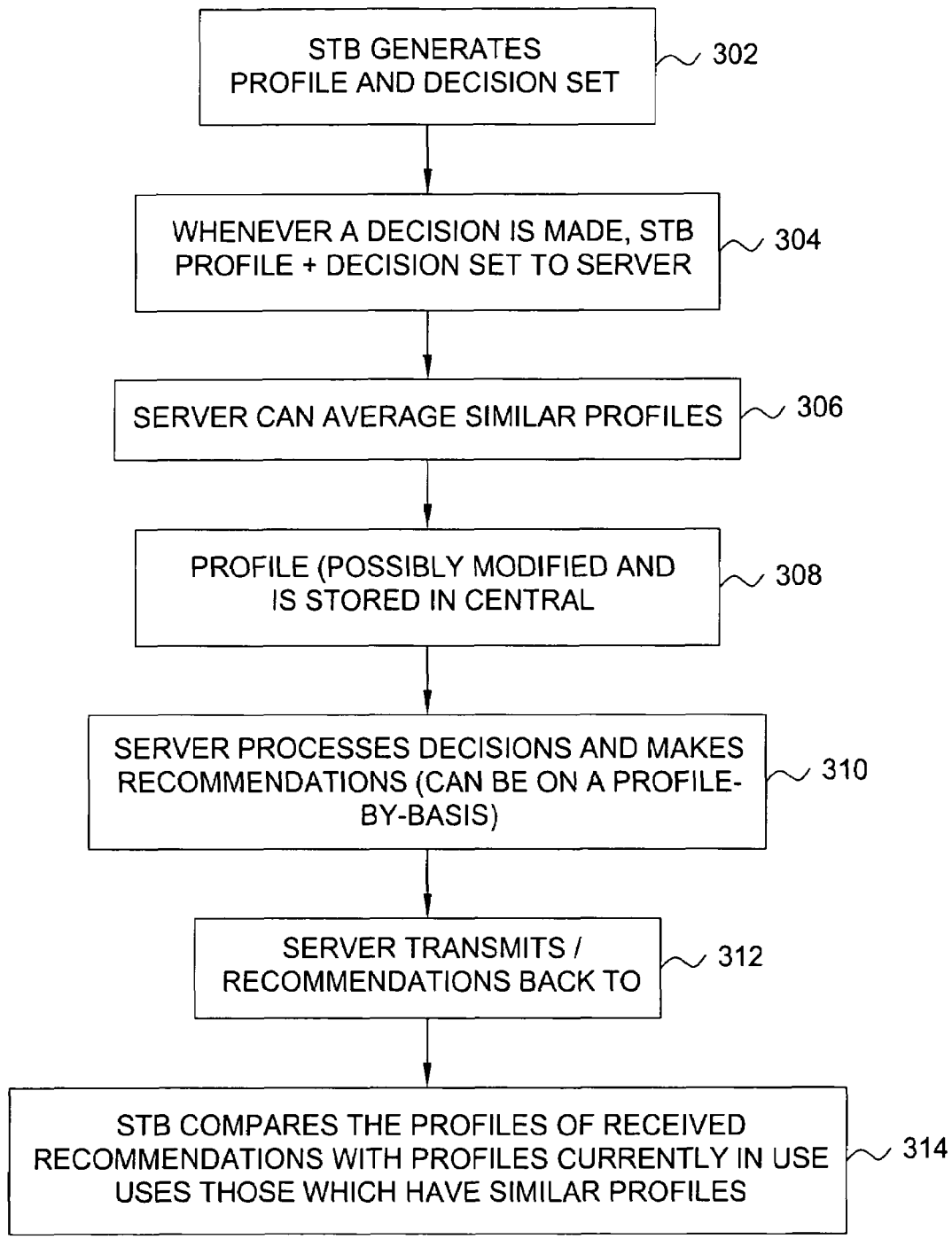
FIG. 3 is a flowchart illustrating method steps of one practice of the present invention.

As shown in FIG. 3, privacy of individuals can also be maintained in such a system by anonymizing or stripping off and discarding personal information that might otherwise be transmitted by the STB prior to storage and processing of the profile information in a step 304. Additionally, upon receiving information from the STB, the server can average the profile with several (or many) profiles in step 306, to erase or "blur" any suggestions of personal information and aggregate information in such a way as to make it impossible to track the source of any decision even if the content of the STB is later exposed.

Having described the illustrated embodiments of the present invention, it will be apparent that modifications can be made without departing from the spirit and scope of the invention, as defined by the appended claims.

The invention claimed is:

1. A method for compact customer profiling, comprising:
assigning, by a server in a video distribution network, a group identification number to each content item in a plurality of content items for distribution by the video distribution network;
broadcasting the group identification number with each content item sent to each set top box (STB) of a plurality of STBs in the video distribution network;

calculating, by each STB, a profile based only on the group identification numbers from the server; and storing the profile at each STB;

wherein an amount of profile calculation and storage at each STB is minimized.

2. The method of claim 1, wherein the group identification number includes a weighting factor.

3. The method of claim 1, further comprising:

changing, at the server, the group identification numbers, without updating any STBs.

4. The method of claim 1, further comprising:

performing collaborative filtering, by the server, using the profiles.

5. The method of claim 1, further comprising:

transmitting, from each STB to the server, the profile, after anonymizing the profile.

6. A system for compact customer profiling, comprising:

a server in a video distribution network for assigning a group identification number to each content item in a plurality of content items for distribution by the video distribution network; and a plurality of set top boxes (STBs) in the video distribution network, each STB to receive broadcasting from the server of the group identification number with each content item received, each STB calculating a profile based only on the group identification numbers from the server and storing the profile;

wherein an amount of profile calculation and storage at each STB is minimized.

7. The system of claim 6, wherein the group identification number includes a weighting factor.

8. The system of claim 6, wherein the group identification numbers are changed at the server, without updating any STBs.

9. The system of claim 6, wherein the server performs collaborative filtering using the profiles.

10. The system of claim 6, wherein each STB transmits the profile to the server, after anonymizing the profile.

* * * * *

UNITED STATES PATENT AND TRADEMARK OFFICE
CERTIFICATE OF CORRECTION

| | | |
|---|---|---|
| PATENT NO. | : 7,027,882 B2 | Page 1 of 1 |
| APPLICATION NO. | : 10/204881 | |
| DATED | : April 11, 2006 | |
| INVENTOR(S) | : Nathanial Thurston et al. | |

It is certified that error appears in the above-identified patent and that said Letters Patent is hereby corrected as shown below:

<u>In the Drawings</u>

FIG. 2, sheet 2 of 3 of the drawings, delete the text in block 202 and insert instead -- SERVER DETERMINES SET OF GROUPS (AND OPTIONALLY: WEIGHTING FACTORS)--.

FIG. 2, sheet 2 of 3 of the drawings, delete the text in block 204 and insert instead --SERVER ASSIGNS EACH SHOW TO ONE OR MORE GROUPS (OPTIONALLY: INCLUDES A WEIGHTING FACTOR INDICATING THE DESIRABILITY OF REPEATS)--.

FIG. 3, sheet 3 of 3 of the drawings, delete the text in block 308 and insert instead --PROFILE (POSSIBLY MODIFIED AND IS STORED IN CENTRAL)--.

Col. 1, line 19 (approx), change "PCT/US02/15561" to --PCT/US02/15385--.

Signed and Sealed this

Eighteenth Day of September, 2007

JON W. DUDAS
*Director of the United States Patent and Trademark Office*